Patented Nov. 7, 1939

2,179,181

UNITED STATES PATENT OFFICE 2,179,181

CELLULOSE SOLUTIONS AND PROCESS OF MAKING SAME

Charles Graenacher, Basel, and Richard Sallmann, Arlesheim, Switzerland, assignors to the firm of Society of Chemical Industry in Basle, Basel, Switzerland No Drawing. Application April 1, 1937, Serial No. 134,454. In Switzerland April 21, 1936

12 Claims. (Cl. 106—40)

This invention is based on the observation that a new kind of cellulose solution is obtainable by treating cellulose with an oxide of a tertiary amine. These oxides have the unexpected property of dissolving cellulose with the formation of viscous liquids, from which the cellulose can be precipitated by a suitable precipitant, for example water, alcohol or dilute acid. The precipitation may be combined with the manufacture of molded articles. In this manner there may be obtained molded articles of regenerated cellulose which have suffered no or comparatively very little degradation. The process may start with crude, bleached or regenerated cellulose. These kinds of cellulose may be used in colored or uncolored condition. There may be added to the solutions of cellulose suitable dyestuffs or substances capable of conversion into dyestuffs, the conversion of which may occur in the regeneration of the cellulose, for example. Such convertible substances are, for example, the sulfuric acid esters of the leuco derivatives of vat dyestuffs; also such esters of water-insoluble dyestuffs containing hydroxy groups in which the ester radical carries groups lending solubility. Esters of this kind are described in applications Serial No. 92,244 filed July 23, 1936, and No. 92,245 filed July 23, 1936, and in the Swiss patent application G. No. 23,683 of April 9, 1936.

Particularly suitable for the purpose of this invention are amine oxides which have not too high a molecular weight—for example which do not contain more than 14 carbon atoms—and do not contain aromatic radicals. Such amine oxides are derived, for example, from such tertiary amines which, on the one hand, contain no aromatic radical and in which, on the other hand, the nitrogen atom is linked at least twice to a radical which contains at the most three carbon atoms, and not more than once to a radical which contains at least two and at the most seven carbon atoms. Such products are for example the oxides of trimethylamine, triethylamine, tripropylamine; also those of other tertiary amines, for instance monomethyldiethylamine, dimethyl-monoethylamine, monomethyl-dipropylamine. Oxides of aliphatic aromatic amines come into question, for instance N-dimethyl-N-diethyl- or N-dipropyl-cyclohexylamine or N-dimethyl-methylcyclohexylamine and further oxides of heterocyclic amines, for instance pyridine oxide. If the oxides as such are solid they are used in the form of liquid mixtures.

The following examples, which could be greatly multiplied, illustrate the invention, the parts being by weight:

Example 1

7 parts of cotton linters are saturated with 93 parts of triethylamine oxide and the whole is thoroughly kneaded and heated with constant stirring at 50–70° C. The linters gradually dissolve, a highly viscous cellulose solution being obtained. This solution may be poured into, or spun in, an aqueous precipitating bath to precipitate the cellulose.

Example 2

10 parts of dry regenerated cellulose are saturated with 90 parts of a mixture of triethylamine oxide and trimethylamine oxide and then kneaded in a Werner-Pfleiderer mixer. A viscous cellulose solution is obtained; the cellulose may be precipitated by pouring the solution into water or dilute acid.

Example 3

90 parts of dimethylcyclohexylamine oxide and 10 parts of regenerated cellulose in the form of artificial silk waste are mixed together and the mixture is kneaded at 80–90° C. The cellulose gradually dissolves and there is formed a highly viscous light colored cellulose solution from which the cellulose may be regenerated as described in the foregoing examples.

What we claim is:

1. Process for the manufacture of solutions of cellulose, consisting in dissolving cellulose in a liquid consisting of oxides of tertiary amines.

2. Process for the manufacture of solutions of cellulose, consisting in dissolving cellulose in a liquid consisting of oxides of tertiary amines which are free from aromatic radicals.

3. Process for the manufacture of solutions of cellulose, consisting in dissolving cellulose in a liquid consisting of oxides of tertiary amines which are free from aromatic radicals and which contain not more than 14 carbon atoms.

4. Process for the manufacture of solutions of cellulose, consisting in dissolving cellulose in a liquid consisting of oxides of tertiary amines which are free from aromatic radicals, and in which the nitrogen atom is linked at least twice to a radical which contains at the most three carbon atoms, and not more than once to a radical which contains at least two and at the most seven carbon atoms.

5. Process for the manufacture of solutions of cellulose, consisting in dissolving cellulose in triethylamine oxide.

6. Process for the manufacture of solutions of cellulose, consisting in dissolving cellulose in dimethylcyclohexylamine oxide.

7. As new compositions of matter, solutions consisting of a liquid solvent consisting of oxides of tertiary amines and cellulose as the solute.

8. As new compositions of matter, solutions consisting of a liquid solvent consisting of oxides of tertiary amines which are free from aromatic radicals, and cellulose as the solute.

9. As new compositions of matter, solutions consisting of a liquid solvent consisting of oxides of tertiary amines which are free from aromatic radicals and which contain not more than 14 carbon atoms, and cellulose as the solute.

10. As new compositions of matter, solutions consisting of a liquid solvent consisting of oxides of tertiary amines which are free from aromatic radicals, and in which the nitrogen atom is linked at least twice to a radical which contains at the most three carbon atoms, and not more than once to a radical which contains at least two and at the most seven carbon atoms, and cellulose as the solute.

11. As new compositions of matter, solutions consisting of triethylamine oxide and cellulose.

12. As new compositions of matter, solutions consisting of dimethylcyclohexylamine oxide and cellulose.

CHARLES GRAENACHER.
RICHARD SALLMANN.